UNITED STATES PATENT OFFICE.

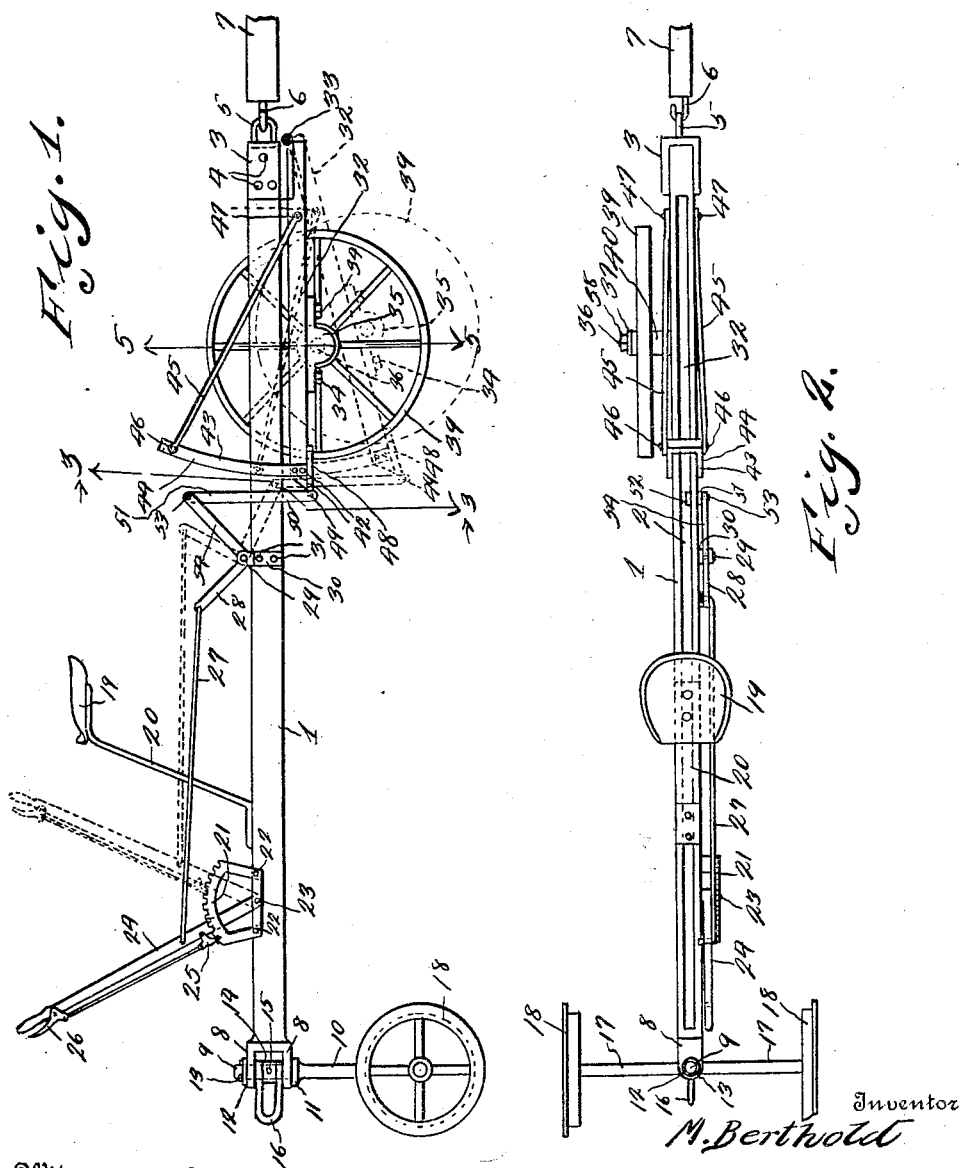

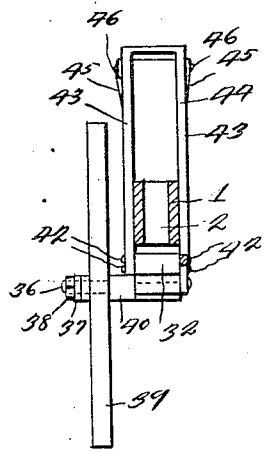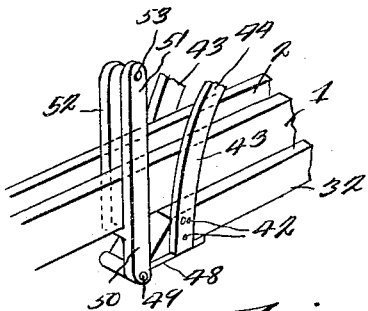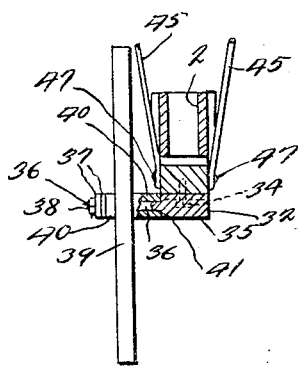

MART BERTHOLD, OF OLEX, OREGON.

PORTABLE DETACHABLE TONGUE FOR HARVESTERS.

1,284,567. Specification of Letters Patent. Patented Nov. 12, 1918.

Application filed December 20, 1917. Serial No. 208,084.

*To all whom it may concern:*

Be it known that I, MART BERTHOLD, a citizen of the United States, residing at Olex, in the county of Gilliam, State of Oregon, have invented new and useful Portable Detachable Tongues for Harvesters; and I do hereby declare the following to be a full, clear, and exact description of the invention, such as will enable others skilled in the art to which it appertains to make and use the same.

This invention relates to a portable detachable tongue for harvesters, in fact a wheel supported tongue, and one of the objects of the invention is to provide a device of this kind, which, when detached from the harvester, may be wheeled and drawn by draft animals from one place to another.

A further object of the invention is to provide a device of this kind having a supporting wheel and means for raising the wheel out of contact with the ground, when the tongue is attached to a harvester, so that the harvester may rest on the ground, whereby its cutting mechanism may actuate close to the ground. Said means for raising the wheel being adapted to be actuated for lowering the wheel into engagement with the ground, so as to raise or slightly elevate the harvester, for drawing the same from one place to another without operating its cutting mechanism. The wheel is also lowered when the tongue is detached from the harvester, so that the supported tongue may be drawn from one place to another.

A further object of the invention having improved features of construction, one of which consists of a pivoted beam (which carries the supporting wheel) bracing means for the beam and means for raising and lowering the beam.

In practical fields the details of construction may necessitate alterations falling within the scope of what is claimed.

The invention comprises further features and combination of parts as hereinafter set forth shown in the drawings and claimed.

In the drawings:—

Figure 1 is a view in side elevation of the wheel supported portable tongue constructed in accordance with the invention.

Fig. 2 is a plan view of Fig. 1.

Fig. 3 is a sectional view on line 3—3 of Fig. 1.

Fig. 4 is a detail perspective view of a link guide device for the free end of the pivoted beam that carries the supporting wheel.

Fig. 5 is a sectional view on line 5—5 of Fig. 1.

Referring more especially to the drawings 1 designates an elongated beam, which is provided with an elongated slot 2, extending substantially the full length of said beam. A U-shaped member 3 is secured at 4 to the rear end of the beam, and has an eye 5, to be engaged by a hook 6 of the harvester frame, a portion of which is shown in Figs. 1 and 2. The forward end of the beam 1 terminates in a pair of forks 8, in which an extension 9 of a vertical axle 10 is mounted, so that the lower fork 8 may rest on a collar 11 integral with the axle 10. A washer 12 is mounted on the upper end of the extension 9, there being a pin 13 extending transversely of the extension 9 above the washer, to hold the washer in place and the extension in the forks. A sleeve 14 is located between the forks 8 and is secured by a pin 15 to the extension 9. This sleeve 14 has an eye 16, to which any suitable draft means may be connected for pulling the tongue or beam 1 forwardly. The axle 10 at its lower end has a transverse axle 17, on which supporting wheels 18 are mounted, to support the forward end of the tongue or beam 1. A seat 19 is mounted on the beam or tongue by means of the member 20. A toothed segment rack 21 is secured at 22 to one side of the beam or tongue 1, and pivoted at 23 to the lower part of the rack is a lever 24, which is provided with a dog 25 to be actuated by the hand grip 26, to engage and disengage the teeth of the segment rack, for holding the lever in different adjusted positions. A rod 27 is connected to the lever 24, and in turn to the arm 28 of a bell crank lever which is pivoted at 29 to a plate 30 which is secured at 31 to one side of the beam or tongue 1. A beam 32 is hinged at 33 to the rear end of the beam or tongue 1, and secured to the under face of this beam 32 by the bolts 34 is a plate 35, which is provided with a lateral reduced extension 36, and secured on the extension revolubly by means of the washers 37 and nut 38 is a supporting wheel 39. The hub portion 40 of the supporting wheel engages the shoulder 41 of the plate 35, thereby holding the wheel in position, but revolubly. Secured at 42 to the end of the beam 32 are the lower ends of the arms 43 of a U-shaped member 44, which arches the opposite sides of the beam or tongue 1. As shown in Fig. 1 the U-shaped member 44 is curved concentric with the hinge connection 33. Braces 45 are connected at 46 to the opposite sides of the upper end of the U-shaped member 44, and are in turn connected at 47 to the beam 32, thereby bracing the U-shaped member 44, which in turn guides the beam 32 as it is raised and lowered on its hinge. A plate 48 is fixed in any suitable manner to the under face of the forward end of the beam 32, and pivoted at 49 to said plate is a link 50, which has a U-shaped part, and the arms 51 and 52 thereof straddle upwardly one side of the beam or tongue 1, thereby additionally guiding the hinged beam 32. The upper end of the arm 51 of the U-shaped part of the link 50 is pivoted at 53 to the other arm 54 of said bell crank lever, which is pivoted at 29. It is to be noted that when the beam or tongue 1 is connected as shown in Figs. 1 and 2 to a harvester frame, the beam 32 is raised, consequently the supporting wheel 39 is out of engagement with the ground or soil. However, when the beam or tongue 1 is detached from the harvester frame, the lever 24 is moved rearwardly, consequently tilting the bell crank lever whereby the beam 32 may be tilted downwardly causing the supporting wheel to engage the soil, so that the beam 1 may be wheeled or pulled from one place to another.

The invention having been set forth what is claimed as new and useful is:—

1. In a wheel supported portable tongue, a beam tongue having detachable connections for a harvester frame, supporting wheels for the forward ends of the beam tongue, said beam tongue having an elongated slot, a second beam hingedly connected to the rear end of the beam tongue and provided with a supporting wheel, a U-shaped member arching the beam tongue and connected to the second beam for guiding the second beam, and means mounted on the beam tongue and provided with a connection with the second beam for raising and lowering the same.

2. In a wheel supported portable tongue, a beam tongue having detachable connections for a harvester frame, supporting wheels for the forward ends of the beam tongue, said beam tongue having an elongated slot, a second beam hingedly connected to the rear end of the beam tongue and provided with a supporting wheel, a U-shaped member arching the beam tongue and connected to the second beam for guiding the second beam, bracing means between the U-shaped member and the second beam, and means mounted on the beam tongue and provided with a U-shaped guide link connection with the second beam for raising and lowering the same, said U-shaped guide link connection arching one side of the beam tongue.

In testimony whereof I have signed my name to this specification in the presence of two subscribing witnesses.

MART BERTHOLD.

Witnesses:
  Frank. Little,
  Frank J. Ritchie.